TYER & HELM.
Soft Rubber Cutter.
No. 3,782.
Patented Oct. 9, 1844.
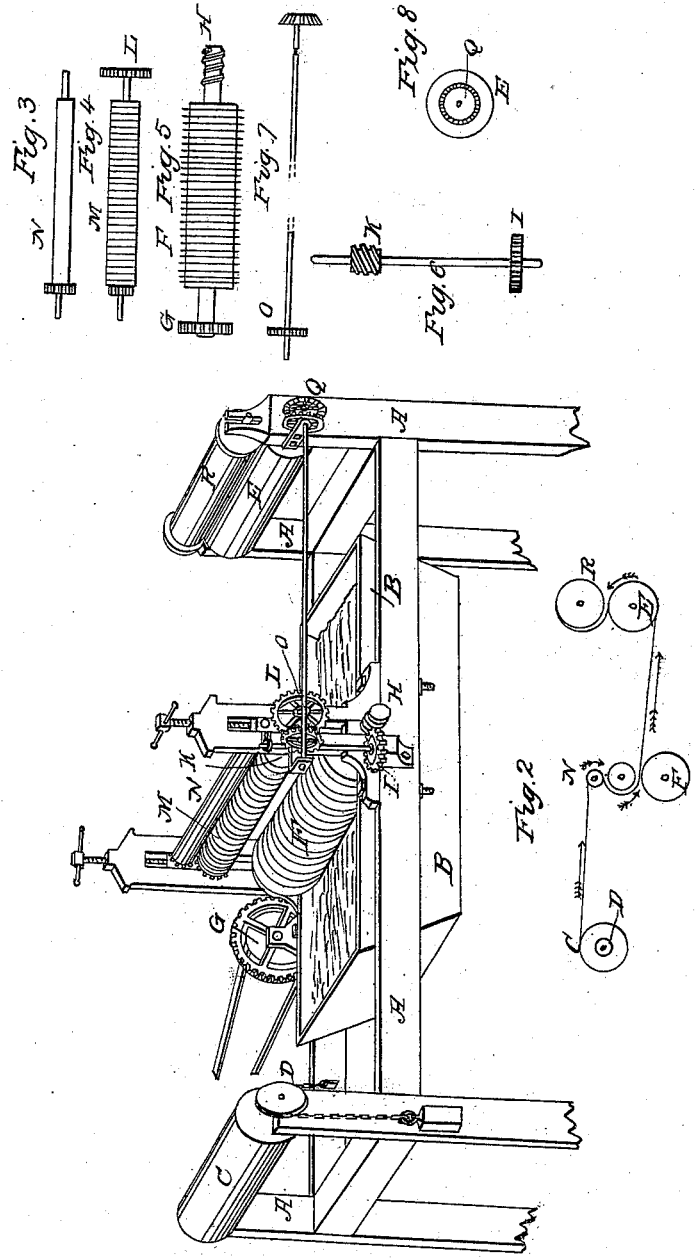

UNITED STATES PATENT OFFICE.

HENRY G. TYER AND JOHN HELM, OF NEW BRUNSWICK, NEW JERSEY.

CUTTING INDIA-RUBBER.

Specification of Letters Patent No. 3,782, dated October 9, 1844.

*To all whom it may concern:*

Be it known that we, the undersigned HENRY GEORGE TYER and JOHN HELM, of New Brunswick, in the county of Middlesex and State of New Jersey, have invented a new and useful improvement in a machine which we denominate a "thread cutter" for manufacturing threads out of sheet india-rubber suitable for the construction of corrugated and other similar description of india-rubber goods; and we hereby declare the following is a full and exact description.

The nature of our invention consists in so constructing and applying a series of circular knives in connection with one or more rollers with which they run in immediate contact and unequal speed so that a sheet of rubber of the kind used in the manufacture of suspenders by the corrugating process is divided into threads of any desirable width and of such length as the sheet may be from which they are to be cut.

In the drawings herewith sent and which is intended to constitute part of the specification Figure 1 represents a side and end view of the machine. Fig. 2 shows a sectional view with the relative position of the mandrel rollers and drums also the line of passage of the sheet rubber in the act of being divided into threads. Figs. 3, 4, 5, 6, 7, 8 are various portions of the machine in detail and the same letters refer to each figure.

A, is the frame work of the machine; B, a trough containing water in which the cutting knives are partially immersed; C, a drum or roller on which a long strip of sheet rubber is wound and from which it passes to the knives; D, friction pulley and weight to regulate the passage off of the rubber; E, drum or roller covered with rubber keeping the threads at slight tension until wound up by the spool, k; F, the cutters formed of circular knives alternating with iron washers firmly screwed up and keyed on shaft at one extremity of which is a pinion working into a wheel in connection with the broad pulley, G, for a band communicating the primary motion; on the other end an endless screw is turned, the lower portion of these knives revolve in the water trough, B; G, the broad iron pulley before referred to; H, an endless screw communicating motion to I, a cog wheel affixed to an upright shaft on which at the required distance is a second endless screw marked K, the endless screw referred to giving motion to the cog L, which is keyed on to the journal of M, a small grooved metal roller such grooves having reference to and receiving the knives of the cutting roller, F, turning in the same direction, and with a velocity of as 1 to 100 at the other extremity of which is a small toothed wheel working into a similar one affixed to the roller, N, a smooth metal roller pressing upon M around which the sheet rubber passes as seen in Fig. 2, and is used for delivering the sheet to the cutter in a smooth even and uniform manner as a necessary consequence the toothed wheel attached must be so calculated that this roller shall pass the sheet in the same time as M; O, is a cog wheel fixed on a long connecting rod at the other end of which is a miter. This wheel receives its motion from the worm K. P, the miter wheel giving action to Q, a similar miter fastened on the journal of the drum E, the said drum finally drawing off the threads at some considerable tension after cutting. R, is a spool or drum with flanges for winding up the threads after their passage from friction drum.

To enable others to construct and use our invention we will proceed to describe its construction and operation.

A mandrel of strong iron or steel is turned off evenly and truly from end to end on which are securely placed circular knives of uniform diameter and thickness separated by washers of such certain thickness as to give the width apart that the threads are required to be wide. This mandrel on which are the circular knives may form the cutting apparatus of itself by simply turning grooves in it the divisions between which being thin and turned off to a fine edge serve the place of knives but in this case the material should be of cast steel or such other metal as will make a cutting instrument. On one end of this mandrel is a pulley or pinion wheels by which the machine is to be driven on the other end and on the outside of the iron frame or pedestal a worm or wheels may be attached to communicate by suitable gearing a slow but uniform motion to a grooved roller running immediately above the mandrel cutter. This roller marked M, in the drawing may be made of any kind of metal the grooves being very narrow and true so that the edge of the cutting knives will just fit in allowing only play enough to save friction from the vibration of the knives.

The cutting roller F, revolves very fast say six hundred revolutions a minute more or less. while the grooved roller revolves six times in the same period of time more or less. The side frames resting on and secured to the wooden frame in which the metal boxes are sustained may be of cast iron and are constructed in the ordinary way of frames for calendering machines. A box or trough to hold water is placed beneath the cutting mandrel and in which when filled with water the knives will be nearly or wholly immersed and without water the machine could not work.

C, is a drum with bearings resting on two of the uprights of the wooden frame around which the sheet rubber is wound and attached to one end of said drum is a friction pulley with a band and weight crossing it to prevent the sheet from feeding too fast. Another drum covered with sheet rubber rests on the opposite uprights around which the threads pass previous to being wound up on a spool which spool rests on this drum and is kept in its proper place by suitable rebates motion is communicated from the immediate working wheels of the machine by means of pulleys and belts or other gearing the friction drum rolls at such speed as to take up the threads as fast as formed and also serves to keep them at a certain tension whereby the work is executed without liability to clog.

A smooth roller, N, is placed immediately over the grooved roller, M, and of just sufficient distance from it to allow the sheet to be passed between them and is used to press the sheet uniformly against the grooved roller and thereby presenting an uniform surface to the cutters. This roller is constructed of metal or other material with bearings resting in the movable boxes which sustain the shaft of the grooved roller and is connected with the latter by cog wheels so calculated as to pass the sheet in the same period of time. Fig. 6, represents the shaft with wheel on one end and worm on the other used to communicate motion from the cutting mandrel to the grooved roller. Fig. 8 represents another shaft running at right angles with it by which the motion is communicated to the friction drum immediately over which and resting on it is one of the loose spools used to roll up the threads as they pass around the drum.

Our machine differs from anything heretofore used for this purpose in everything excepting the circular knives attached to the mandrel. To this in itself we make no claim the same having been used in connection with a wood or copper roller both revolving at the same speed both being pressed tight together whereby the threads were imperfectly cut and the material greatly injured in strength and elasticity. We also disclaim the invention of the gearing connecting the various parts of this machine such having been in common use for communicating motion from part of a machine to another. We also disclaim the invention of drums as such for taking up or delivering of the goods.

What we do claim in the above described machine and desire to secure by Letters Patent is—

1. The use of a series of circular knives running with great speed in water in connection with a small grooved roller each knife working without friction in its separate groove both turning in the same direction but with unequal speed say the knives to the roller as 100 to 1.

2. We also claim and desire to secure the use of in connection with this machine another small and smooth roller for the purpose of pressing the sheet in its passage evenly and uniformly on the grooved roller thereby preventing the clogging of the material and without which the machine would not be so efficient in action whereby we cut and divide a sheet of rubber of any desirable length into separate threads perfectly and effectually without injury to the strength and elasticity of the material the whole operating substantially as above set forth.

HENRY GEORGE TYER.
JOHN HELM.

Signed this 23d day of September 1844 in our presence at New Brunswick New Jersey:
Ch. Dunham,
W. H. Leupp.